United States Patent

Kato et al.

(10) Patent No.: US 8,789,845 B2
(45) Date of Patent: Jul. 29, 2014

(54) VEHICLE AIR BAG SYSTEM

(75) Inventors: Hideki Kato, Nissin (JP); Yosuke Shimizu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/280,767

(22) Filed: Oct. 25, 2011

(65) Prior Publication Data

US 2012/0098240 A1 Apr. 26, 2012

(30) Foreign Application Priority Data

Oct. 26, 2010 (JP) ................................. 2010-239824

(51) Int. Cl.
*B60R 21/232* (2011.01)
*B60R 21/233* (2006.01)
*B60R 21/213* (2011.01)

(52) U.S. Cl.
CPC ............. *B60R 21/232* (2013.01); *B60R 21/233* (2013.01); *B60R 21/213* (2013.01); *B60R 2021/23308* (2013.01)
USPC ...................... 280/730.2; 280/729; 280/743.1

(58) Field of Classification Search
CPC .. B60R 21/213; B60R 21/232; B60R 21/231; B60R 21/233; B60R 2021/23308
USPC .................... 280/729, 730.2, 743.1
See application file for complete search history.

(56) References Cited

U.S. PATENT DOCUMENTS

| 6,394,487 | B1 * | 5/2002 | Heudorfer et al. ............ 280/729 |
| 7,185,914 | B2 * | 3/2007 | Recker et al. .............. 280/730.2 |
| 7,380,819 | B2 * | 6/2008 | Fricke et al. ................. 280/736 |
| 7,942,444 | B2 * | 5/2011 | Steinbach et al. ......... 280/743.2 |
| 8,267,423 | B2 * | 9/2012 | Wipasuramonton et al. ......................... 280/730.2 |
| 2005/0269806 | A1 * | 12/2005 | Huber et al. ............... 280/730.2 |
| 2008/0054603 | A1 * | 3/2008 | Breed et al. ................... 280/729 |
| 2008/0054606 | A1 | 3/2008 | Mitsuo et al. |
| 2008/0296876 | A1 | 12/2008 | Ideue |
| 2008/0309056 | A1 * | 12/2008 | Ohba ......................... 280/730.2 |
| 2012/0200069 | A1 * | 8/2012 | Kato et al. ................. 280/730.2 |

FOREIGN PATENT DOCUMENTS

| JP | 2001-171471 A | 6/2001 |
| JP | 2004-148976 A | 5/2004 |
| JP | 2007-050847 A | 3/2007 |
| JP | 2007-161163 A | 6/2007 |
| JP | 2007-161167 A | 6/2007 |
| JP | 3966777 B | 8/2007 |
| JP | 2008-056117 A | 3/2008 |
| JP | 2008-114631 A | 5/2008 |
| JP | 2008-290529 A | 12/2008 |
| JP | 4420067 B | 2/2010 |

* cited by examiner

*Primary Examiner* — Paul N Dickson
*Assistant Examiner* — George Spisich
(74) *Attorney, Agent, or Firm* — Gifford, Krass, Sprinkle, Anderson & Citkowski, P.C.

(57) ABSTRACT

A vehicle air bag system includes a side air bag that is housed folded up in a vehicle seat and that deploys between an occupant seated in the vehicle seat and a front side door by receiving a supply of gas when a side collision occurs, and a curtain air bag that is housed folded up in an upper edge portion of a door opening and that deploys in a curtain shape downward by receiving a supply of gas when a side collision and a rollover occur. The curtain air bag has a delay chamber that deploys later than a main chamber by receiving a supply of gas from the main chamber via a narrowed passage. The delay chamber deploys with a lower end side below a beltline and in an area that overlaps with a deployment area of a side air bag.

16 Claims, 9 Drawing Sheets

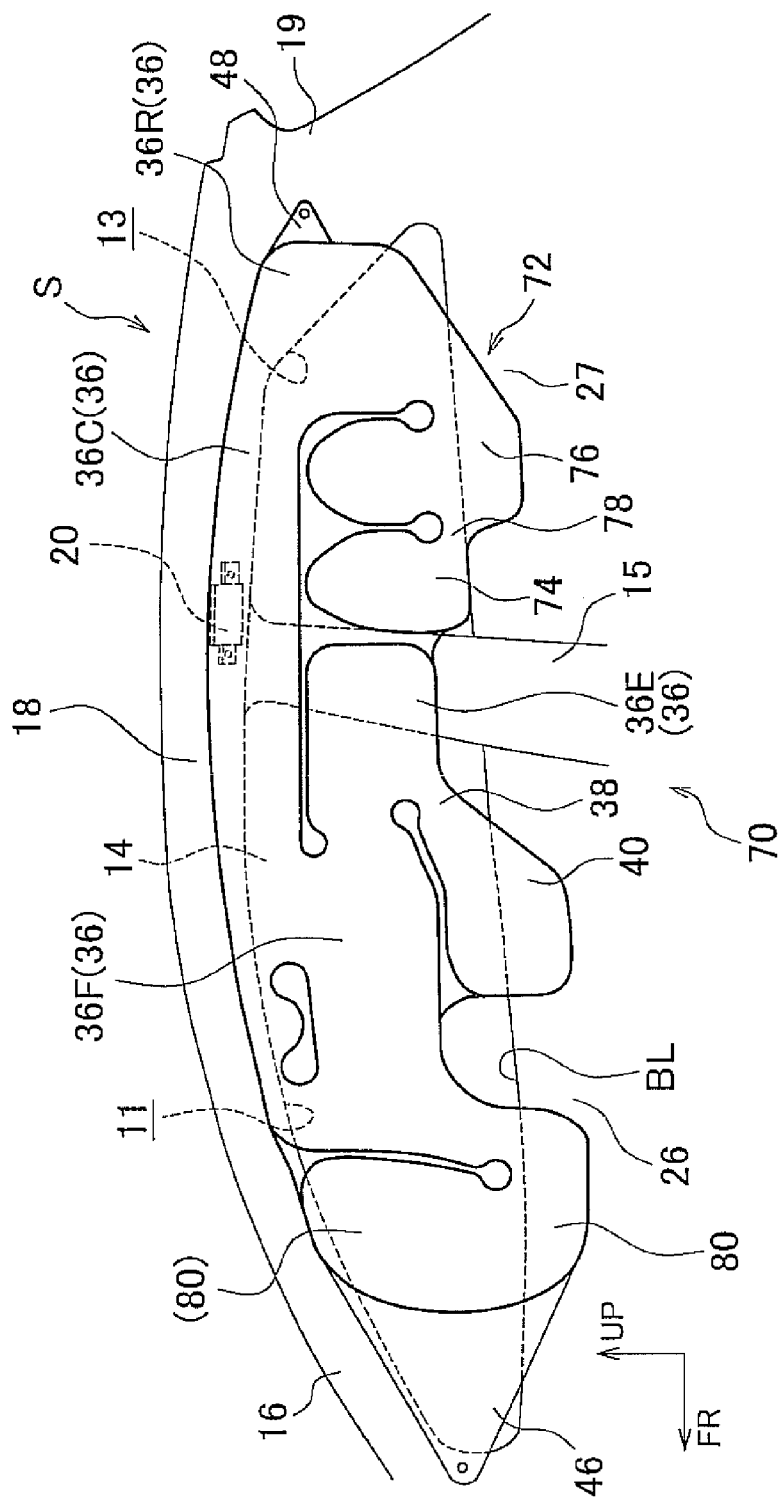

VEHICLE AIR BAG SYSTEM

CROSS REFERENCE TO RELATED APPLICATIONS

This application claims the priority to Japanese Patent Application No. 2010-239824, filed on Oct. 26, 2010, which is incorporated herein by reference in its entirety including the specification, drawings and abstract.

BACKGROUND OF THE INVENTION

1. Field of the Invention

The invention relates to a vehicle air bag system that includes both a side air bag and a curtain air bag.

2. Description of Related Art

Japanese Patent Application Publication No. 2007-161167 (JP-A-2007-161167), for example describes technology in which a curtain air bag has an auxiliary deployment portion that extends below a beltline, at an area aside from where an occupant sits. Also, Japanese Patent No. 4420067, for example, describes technology in which a curtain air bag deploys to a position that overlaps with a deployment area of a side air bag, and that has a deployment shape in which the deployed side air bag is able to fit together with it.

However, with the technology described in JP-A-2007-161167, the auxiliary deployment portion is deployed in a position away from the occupant, so there is room for improvement in view of head protection when a rollover occurs. Also, with the technology described in Japanese Patent No. 4420067, the thickness of the portion of the curtain air bag that overlaps with the side air bag when the curtain air bag is deployed is unable to be made thick, so there is room for improvement in view of head protection when a rollover occurs.

SUMMARY OF THE INVENTION

The invention thus provides a vehicle air bag system capable of improving occupant protection performance when a vehicle rollover occurs, by a curtain air bag provided together with a side air bag.

A first aspect of the invention relates to a vehicle air bag system that includes a side air bag that is housed folded up in a vehicle seat or a vehicle body side portion, and that inflates by receiving a supply of gas when a side collision of the vehicle occurs, and that deploys between an occupant seated in the vehicle seat and the vehicle body side portion; a curtain air bag that is housed folded up in an upper edge portion of an opening for getting into and out of the vehicle, in the vehicle body, and that inflates by receiving a supply of gas when a side collision of the vehicle and a rollover of the vehicle occur, and that deploys in a curtain shape downward with respect to the vehicle; and a delayed deployment portion that is provided in the curtain air bag, and that inflates later than a main deployment portion of the curtain air bag by receiving a supply of gas through a narrowed passage from the main deployment portion of the curtain air bag, and that deploys with an upper end side connected to the curtain air bag and a lower end side below a beltline and in an area that overlaps with a deployment area of the side air bag.

With this air bag system, when a side collision of the vehicle occurs, for example, both the side air bag and the curtain air bag deploy and protect the occupant. The delayed deployment portion of the curtain air bag receives a supply of gas via the narrowed passage, so the supply of gas is delayed (i.e., restricted) more than it is with the main deployment portion, and as a result, the delayed deployment portion of the curtain air bag deploys later than the main deployment portion. If the vehicle rolls over following a side collision, this delayed deployment portion will deploy with the upper end side connected to the curtain air bag and the lower end side overlapping with the portion below the beltline in the deployment area of the side air bag. At this time, the side air bag has finished fulfilling its function, so the delayed deployment portion is able to deploy at the planned deployment position without interference from the side air bag. to deploy at the planned deployment position without interference from the side air bag.

Also, the delayed deployment portion that deploys overlapping with the side air bag, i.e., the delayed deployment portion that deploys near the occupant, effectively suppresses the head of the occupant from moving toward the outside of the vehicle following a rollover, while supporting the load (i.e., the reaction force) from the occupant by the lower portion of the delayed deployment portion abutting against the portion below the beltline of the vehicle body.

In this way, with this air bag system, the occupant protection performance when a vehicle rollover occurs by the curtain air bag provided together with the side air bag can be improved.

In the air bag system described above, the delayed deployment portion may include a first delayed deployment portion that receives a supply of gas through the narrowed passage from the main deployment portion of the curtain air bag, a second delayed deployment portion that receives a supply of gas from the first delayed deployment portion, and that deploys with a lower end side below the beltline and in an area that overlaps with a deployment area of the side air bag, and a restricting structure that restricts the supply of gas to the second delayed deployment portion from the first delayed deployment portion until an internal pressure of the first delayed deployment portion exceeds a predetermined value.

Accordingly, with this air bag system, gas is supplied a little at a time also to the first delay deployment portion through the narrowed passage while the curtain air bag deploys. Meanwhile, when the internal pressure of the first delayed deployment portion is low, i.e., lower than a predetermined pressure, the supply of gas to the second delayed deployment portion is restricted by the restricting structure. Therefore, the supply of gas to the second delayed deployment portion effectively starts after the first delayed deployment portion has finished being deployed. Accordingly, with this vehicle air bag system, when a rollover occurs, the period of time that the deployment of the second delayed deployment portion with a deployment area that overlaps with the side air bag is delayed with respect to the curtain air bag is easily controlled.

The curtain air bag may have a pillar wrap portion that deploys overlapping with a center pillar when viewed from a side, and that is communicated with a rear portion of the delayed deployment portion via the narrowed passage, and the delayed deployment portion may be configured to receive a supply of gas from the pillar wrap portion via the narrowed passage, and deploy with the lower end side below the beltline and in an area that overlaps with the deployment area of the side air bag for a front seat when viewed from the side.

Accordingly, with this air bag system, gas is supplied from the pillar wrap portion via the narrowed passage such that the delayed deployment portion deploys after the pillar wrap portion deploys overlapping with the center pillar. The rear portion of the delayed deployment portion is communicated with the pillar wrap portion via the narrowed passage, so the reaction force when protecting the head of an occupant in the front seat is also able to be supported by the pillar wrap portion as well, which enables the occupant protection performance to be improved.

The first delayed deployment portion may deploy overlapping with the center pillar when viewed from the side, and be communicated with the rear portion of the second delayed deployment portion when at least the internal pressure exceeds the predetermined pressure. Also, the second delayed deployment portion may be configured to deploy with the lower end side below the beltline and in an area that overlaps with the deployment area of the side air bag for a front seat when viewed from the side.

In this way, with the air bag system, gas is supplied from the first delayed deployment portion via the second narrowed passage such that the second delayed deployment portion deploys after the first delayed deployment portion deploys overlapping with the center pillar. The rear portion of the second delayed deployment portion is communicated with the first delayed deployment portion such that gas is supplied from the first delayed deployment portion after at least the restriction by the restricting structure is relieved. Therefore, the reaction force when protecting the head of an occupant in the front seat can be supported by the first delayed deployment portion as well, so the occupant protection performance when a rollover occurs is improved.

A direction in which gas is supplied from the first delayed deployment portion to the second delayed deployment portion may be opposite a direction in which gas is supplied from the main deployment portion of the curtain air bag to the first delayed deployment portion.

In this air bag system, gas supplied from the curtain air bag to the first delayed deployment portion doubles back inside the first delay chamber and is supplied to the second delay chamber. That is, the inflow of gas to the second delayed deployment portion can be more effectively controlled than it can with a structure in which gas passes straight through the first delayed deployment portion. Therefore, the time of the deployment delay of the second delay chamber with a deployment area that overlaps with the side air bag, with respect to the curtain air bag is even easier to control.

The side air bag may be housed in the vehicle seat, the position of which is able to be adjusted in a front-back direction, and the delayed deployment portion may deploy with the lower end side overlapping with the side air bag in an area from a deployment position of the side air bag when the vehicle seat is in a front-most position to a deployment position of the side air bag when the vehicle seat is in a rear-most position.

Accordingly, the delayed deployment portion is able to deploy near the occupant regardless of the front-back position of the vehicle seat, so the head of the occupant is able to easily be protected by this delayed deployment portion when a rollover occurs.

The narrowed passage may have an inside diameter in a gas flow state of no less than 40 mm and no more than 70 mm.

Flaying the inside diameter of the narrowed passage be no less than 40 mm and no more than 70 mm enables the delayed deployment portion to deploy after the side air bag has finished fulfilling its function. That is, if the inside diameter of the narrowed passage is greater than 70 mm, the delayed deployment portion may deploy before the side air bag has finished fulfilling its function. On the other hand, if the inside diameter of the narrowed passage is less than 40 mm, the stress acting on the narrowed passage may become excessive.

A volume of the delayed deployment portion may be no less than $1/6$ and no more than $1/3$ of a total volume of the curtain air bag.

In this air bag system, having the volume of the delayed deployment portion be no less than $1/6$ and no more than $1/3$ of the total volume of the curtain air bag (i.e., the volume that includes the volume of the delayed deployment portion) enables the internal pressure of the delayed deployment portion that has deployed after a delay to be a pressure that is equal to or greater than the internal pressure required when a rollover occurs.

The curtain air bag may have a front wrap portion that inflates and deploys forward of a front seat so as to overlap with a portion below the beltline of the vehicle body and a front pillar when viewed from the side.

In this air bag system, when the front wrap portion receives a load from the occupant side, it abuts against both the portion below the beltline of the vehicle body and the front pillar. Therefore, in this air bag system, it is possible to effectively inhibit the head of an occupant in the front seat from moving toward the outside of the vehicle by the front wrap portion as well. The front wrap portion may be part of the main deployment portion, or the front wrap portion may deploy later than the main deployment portion.

The curtain air bag may have a rear wrap portion that deploys with an upper end side connected to the main deployment portion of the curtain air bag, and a lower end side overlapping with a portion below the beltline of the vehicle body when viewed from the side.

In this air bag system, when the rear wrap portion receives a load from the occupant side, it abuts against the portion below the beltline of the vehicle body on the lower end side, while being supported by the vehicle body via the main deployment portion of the curtain air bag on the upper end side. Therefore, in this air bag system, it is possible to effectively inhibit the head of an occupant in the rear seat from moving toward the outside of the vehicle by the rear wrap portion as well. The rear wrap portion may be part of the main deployment portion, or the rear wrap portion may deploy later than the main deployment portion.

In the air bag system described above, the main deployment portion of the curtain air bag may have a front main deployment portion that deploys at a side of a front seat and a rear main deployment portion that deploys at a side of a rear seat, and an inflator that supplies gas to the curtain air bag may be arranged between the front main deployment portion and the rear main deployment portion in an upper edge portion of the opening for getting into and out of the vehicle.

In this air bag system, the front portion and the rear portion of the curtain air bag inflate and deploy by receiving a supply of gas from a common inflator. The inflator is arranged between the front portion and the rear portion of the curtain air bag, so the front portion and the rear portion of the curtain air bag (except for the delayed deployment portion) are able to be deployed in a short period of time.

As described above, the vehicle air bag system according to the invention is able to improve occupant protection performance when a vehicle rollover occurs, by a curtain air bag that is provided together with a side air bag.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a side view, as viewed from the inside of the vehicle cabin, of the general overall structure of a vehicle air bag system according to a third example embodiment of the invention.

DETAILED DESCRIPTION OF EMBODIMENTS

Figure 1:
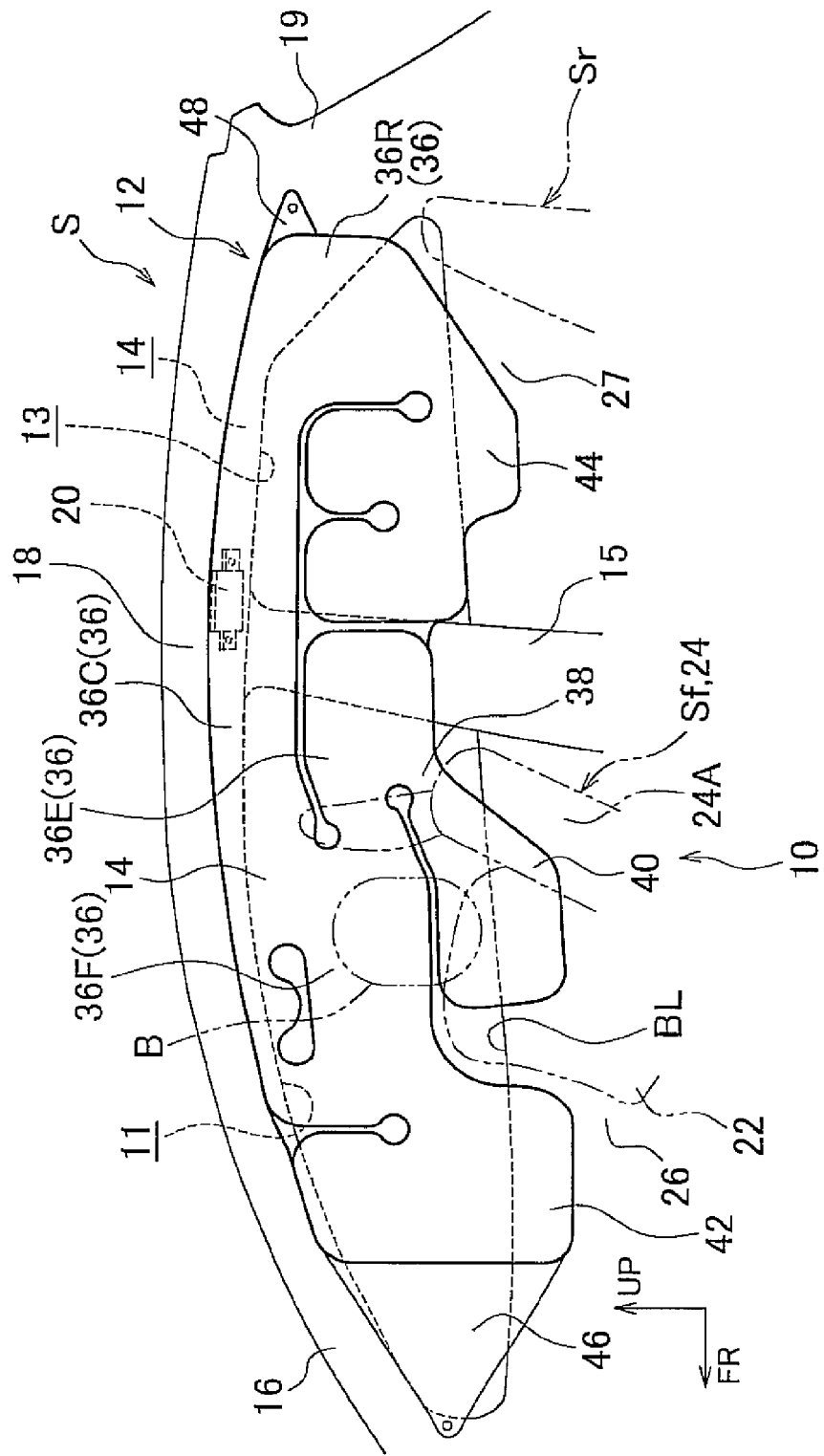
FIG. 1 is a side view, as viewed from the inside of a vehicle cabin when a front seat is in the front-most position, of the general overall structure of a vehicle air bag system according to a first example embodiment of the invention.

A vehicle air bag system 10 according to a first example embodiment of the invention will now be described with reference to FIGS. 1 to 5. First, the general overall structure of the vehicle air bag system 10 will be described, and then the structure of a curtain air bag 12 will be described. The arrows FR, UP, IN, and OUT shown as appropriate in the drawings indicate the directions front (i.e., advancing), up, inside in the vehicle width direction, and outside in the vehicle width direction, respectively, with respect to a vehicle S to which the vehicle air bag system 10 has been applied. Hereinafter, in descriptions using simply the longitudinal and vertical directions, these will be indicated as front or back in the longitudinal (i.e., front-back) direction of the vehicle and up or down in the vertical direction of the vehicle, unless otherwise specified.

(Overall Structure of the Vehicle Air Bag System)

FIG. 1 is a front view as viewed from inside the vehicle cabin of the vehicle S to which the vehicle air bag system 10 has been applied. As shown in the drawing, the vehicle air bag system 10 includes the curtain air bag 12 and a side air bag 22. The curtain air bag 12 is formed so as to deploy along a side window glass 14 and a center pillar (B-pillar) 15 that serve as the inside portion of the vehicle cabin. In this example embodiment, the curtain air bag 12 is structured so as to cover the front and back side window glass 14 positioned next to a front seat Sf and a rear seat Sr.

Although not shown, the curtain air bag 12 is housed rolled up or folded up accordion style, for example, in a long shape, from a front pillar (A-pillar) 16 to near a rear pillar 19 along a roof side portion 18. In a predetermined case that will be described later, the curtain air bag 12 will protect the head of an occupant in the front seat or rear seat by deploying along the front and back side window glass 14 and center pillar 15, as shown in FIG. 1. The roof side portion 18 in this example embodiment forms an upper edge of front and back door openings 11 and 13 that serve as openings for getting into and out of the vehicle that are surrounded by the roof side portion 18, the front pillar 16, the center pillar 15, and the rear pillar 19. The curtain air bag 12 is housed between a roof side rail and a roof headlining that form the roof side portion 18.

Also, the vehicle air bag system 10 includes an inflator 20 for supplying gas into the curtain air bag 12. The inflator 20 is a combustion type inflator or a cold gas type inflator, and supplies a large quantity of gas into the curtain air bag 12 when activated. A gas injection port of the inflator 20 is communicated with the inside of the curtain air bag 12. In this example embodiment, the inflator 20 is arranged in the roof side portion 18. The shape of the curtain air bag 12 when deployed (i.e., the deployed shape) and the arrangement of the inflator 20 will be described later.

The side air bag 22 deploys between a vehicle seat 24 that forms the front seat Sf in which an occupant sits, and a front side door 26 of the vehicle body, thereby protecting the upper body (i.e., the waist and chest) of the occupant seated in the vehicle seat 24. The upper end of the side air bag 22 in this example embodiment is positioned slightly above a beltline BL along the lower edge of the side window glass 14 of the vehicle S. The side air bag 22 may also be configured to protect up to a shoulder of the occupant.

Although not shown, the side air bag 22 is housed rolled up or folded up accordion style, for example, in the vertical direction in a side portion, on the outside in the vehicle width direction, of a seat back 24A of the vehicle seat 24. This side air bag 22 inflates and deploys in response to the supply of gas from an inflator 28 (see FIG. 5). The inflator 28 is configured as a combustion type inflator or a cold gas type inflator that supplies gas by burning gas producing material, and is arranged together with the side air bag 22 inside of the seat back 24A.

Figure 2:
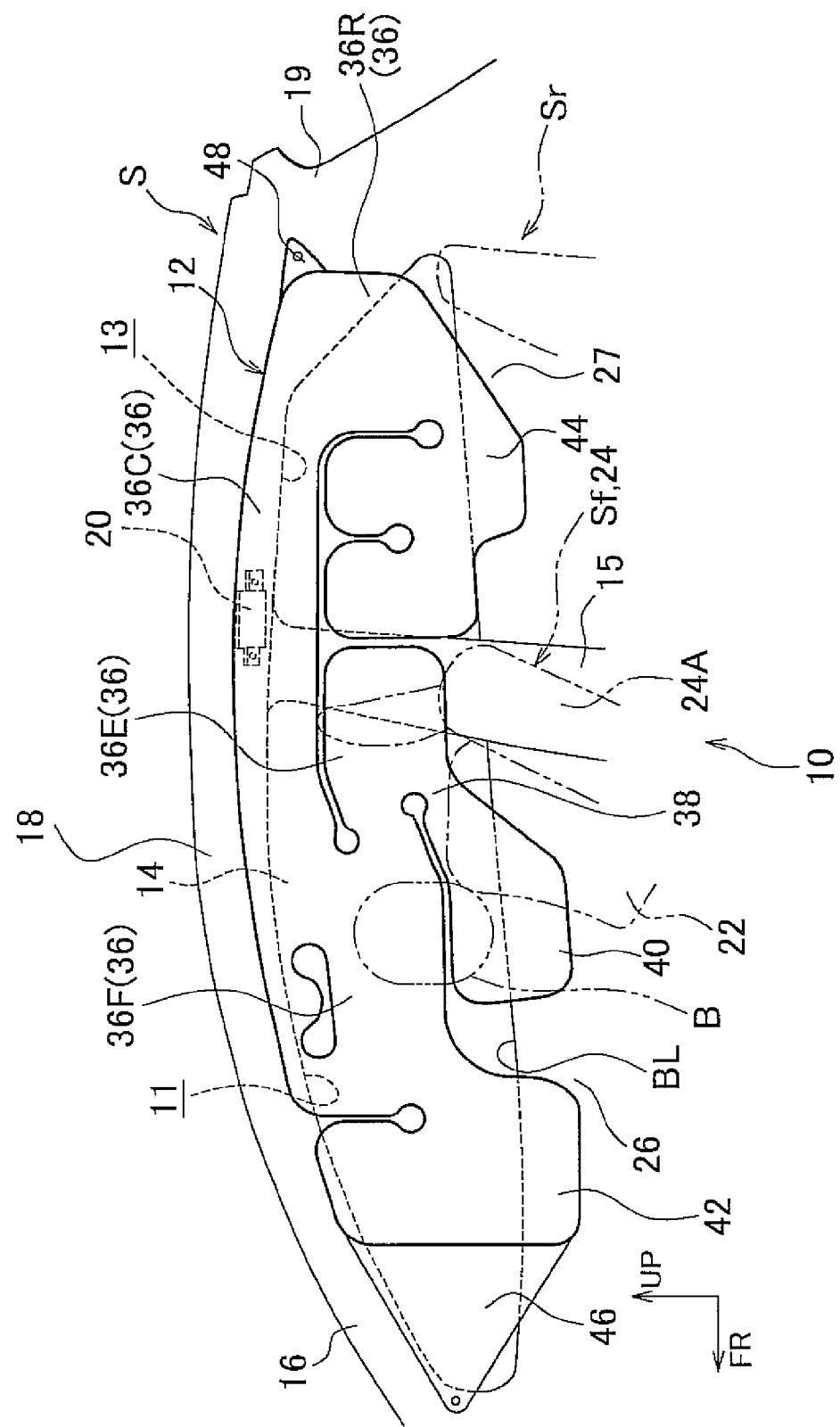
FIG. 2 is a side view, as viewed from the inside of the vehicle cabin when a front seat is in the rear-most position, of the general overall structure of the vehicle air bag system according to the first example embodiment of the invention.

Accordingly, the side air bag 22 is configured to deploy between an occupant seated in the vehicle seat 24 and the front side door 26, at a front-most position of the vehicle seat 24 shown in FIG. 1 (i.e., a position when the vehicle seat is positioned as far forward as it will go), a rear-most position of the vehicle seat 24 shown in FIG. 2 (i.e., a position when the vehicle seat is positioned as far back as it will go), and any position in between.

Figure 5:
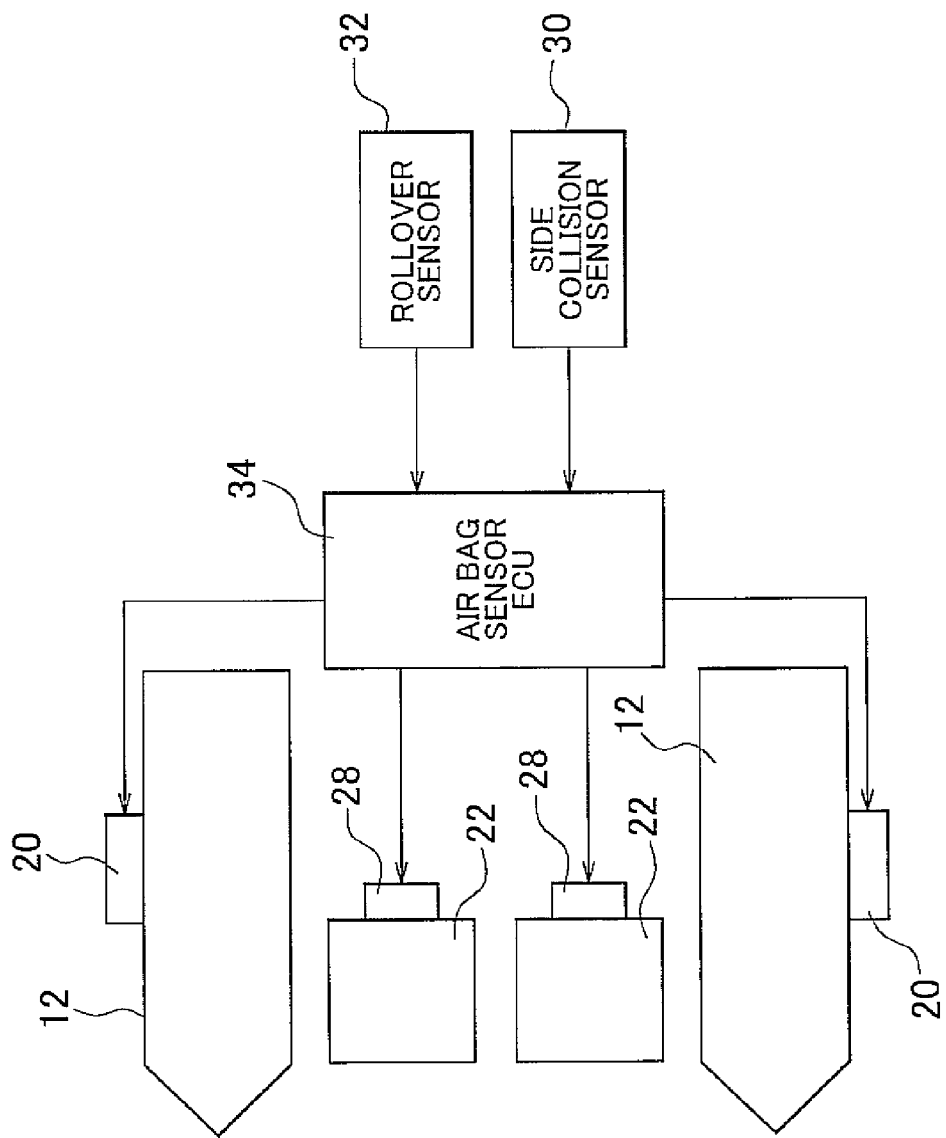
FIG. 5 is a block diagram showing a simple view of a control system and the like of the vehicle air bag system according to the first example embodiment of the invention.

One curtain air bag 12 and one inflator 20 that are described above are arranged as a pair on both the left and right side, as shown in a simple view in FIG. 5. One side air bag 22 and one inflator 28 are also provided as a pair in both the left and right vehicle seats 24 (i.e., the driver's seat and the front passenger's seat).

Furthermore, the vehicle air bag system 10 includes an air bag ECU 34 that is electrically connected to both a side collision sensor 30 and a rollover sensor 32, as shown in FIG. 5. The side collision sensor 30 is configured to predict or detect (the inevitability of) a side collision of the vehicle 5, and output a side collision detection signal to the air bag ECU 34. The rollover sensor 32 is configured to predict or detect (the inevitability of) a rollover of the vehicle 5, and output a rollover detection signal (hereinafter simply referred to as a "R/O detection signal") to the air bag ECU 34.

Upon receiving a side collision detection signal, the air bag ECU 34 activates the inflator 20 and the inflator 28 on the side of the side collision (i.e., the near side). Therefore, when there is a side collision to the vehicle 5, both the curtain air bag 12 and the side air bag 22 receive a supply of gas, such that they both inflate and deploy. Also, upon receiving a R/O detection signal, the air bag ECU 34 activates the inflator 20 on both sides in the vehicle width direction. Upon receiving a R/O detection signal after a side collision, the air bag ECU 34 activates the inflator 20 on the side opposite the impact side that is already activated. Also, in this example embodiment, when a R/O detection signal is received, the air bag ECU 34 will not active the inflator 28.

(Structure of the Curtain Air Bag)

Hereinafter, the structure of the curtain air bag 12 will be described in detail. Unless otherwise specified, the structure (i.e., shape) of the curtain air bag 12 when inflated and deployed will be described. As shown in FIG. 1, the curtain air bag 12 includes a main chamber 36 that serves as a main deployment portion, and a delay chamber 40 that serves as a delayed deployment portion that is communicated via a narrowed passage 38 to the main chamber 36.

Figure 4:
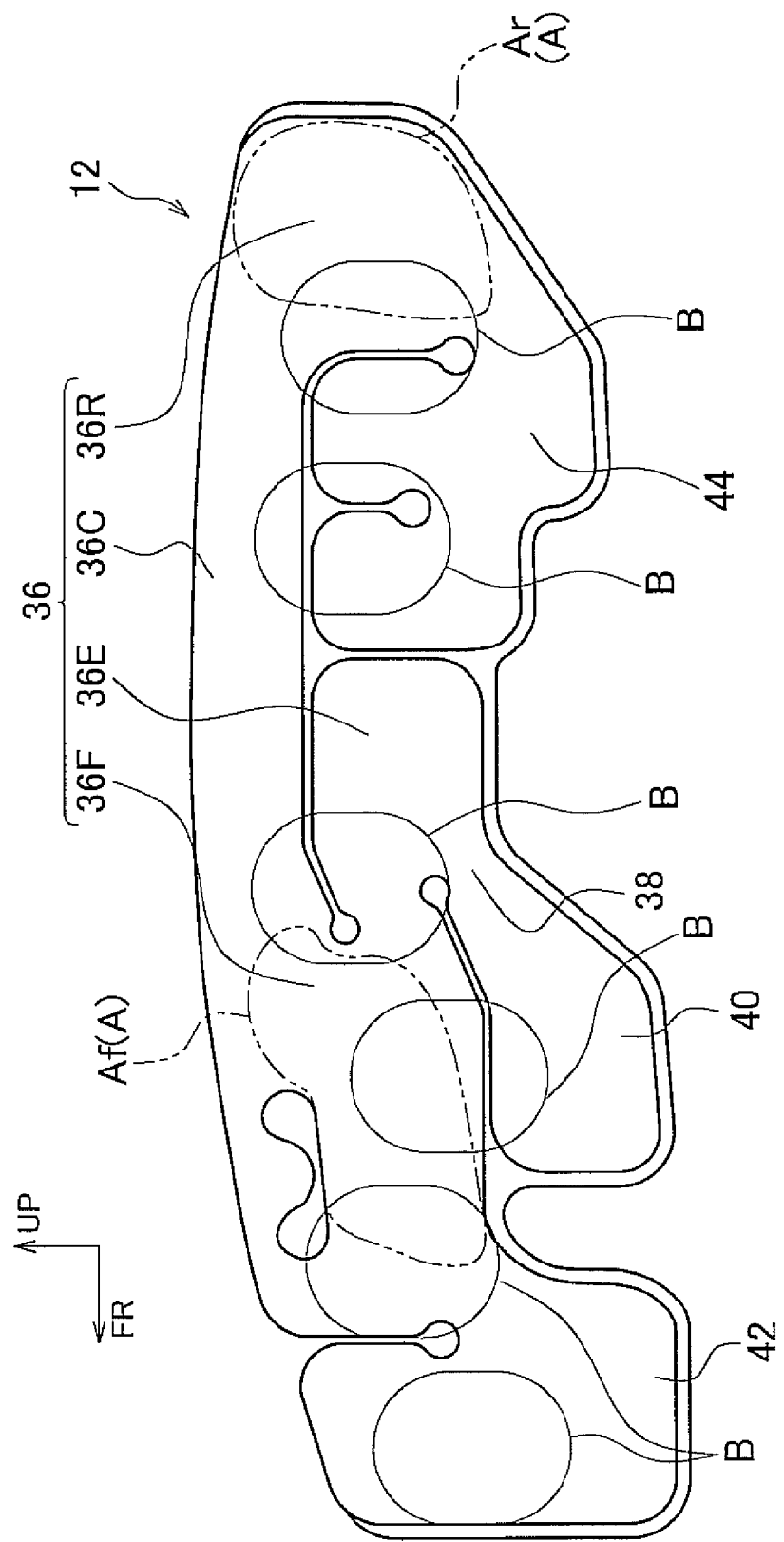
FIG. 4 is a side view of a curtain air bag that is included in the vehicle air bag system according to the first example embodiment of the invention, in a deployed state.

The main chamber 36 inflates and deploys in an area where the head is protected against a side collision (see area A in FIG. 4). More specifically, the main chamber 36 includes a front main chamber 36F, a rear main chamber 36R, and a gas supply passage 36C. The front main chamber 36F inflates and deploys so as to cover an area that includes an area Af for the front seat Sf where the head is protected against a side collision. The rear main chamber 36R inflates and deploys so as to cover an area that includes an area Ar for the rear seat Sr where the head is protected against a side collision. The gas supply passage 36C communicates the front main chamber 36F with the rear main chamber 36R along the roof side portion 18.

The inflator 20 is provided to supply gas from substantially the center portion of the gas supply passage 36C. That is, the inflator 20 is arranged between the front main chamber 36F that is the front portion of the curtain air bag 12 and the rear main chamber 36R that is the rear portion of the curtain air bag 12. The inflator 20 may also be arranged in C-pillar or D-pillar.

Further, an extending chamber 36E that is an extended deployment portion inflates and deploys to the rear of the front main chamber 36F and below the gas supply passage 36C. The front end of this extending chamber 36E is connected to the front main chamber 36F so as to receive a supply of gas from the front main chamber 36F. The rear portion of the extending chamber 36E overlaps with the center pillar 15 when viewed from the side. That is, the extending chamber 36E corresponds to the pillar wrap portion.

The narrowed passage 38 extends from the front lower portion of the extending chamber 36E generally forward and downward, and is communicated with the rear portion of the delay chamber 40. The delay chamber 40 inflates and deploys below the front main chamber 36F in response to gas being supplied through the narrowed passage 38.

The upper edge portion of the delay chamber 40 is attached (i.e., connected) to the lower edge portion of the front main chamber 36F, and the lower edge portion of the delay chamber 40 is positioned below the beltline BL, as shown in FIG. 1. Therefore, the deployment area of the lower portion of the delay chamber 40 is set to overlap with the deployment area of the side air bag 22 when viewed from the side. Accordingly, with the vehicle air bag system 10, when a side collision occurs, the lower portion of the delay chamber 40 deploys so as to overlap with the deployment area of the upper portion of the side air bag 22 when the side air bag 22 is in a deployed state, below the beltline BL.

Figure 3:
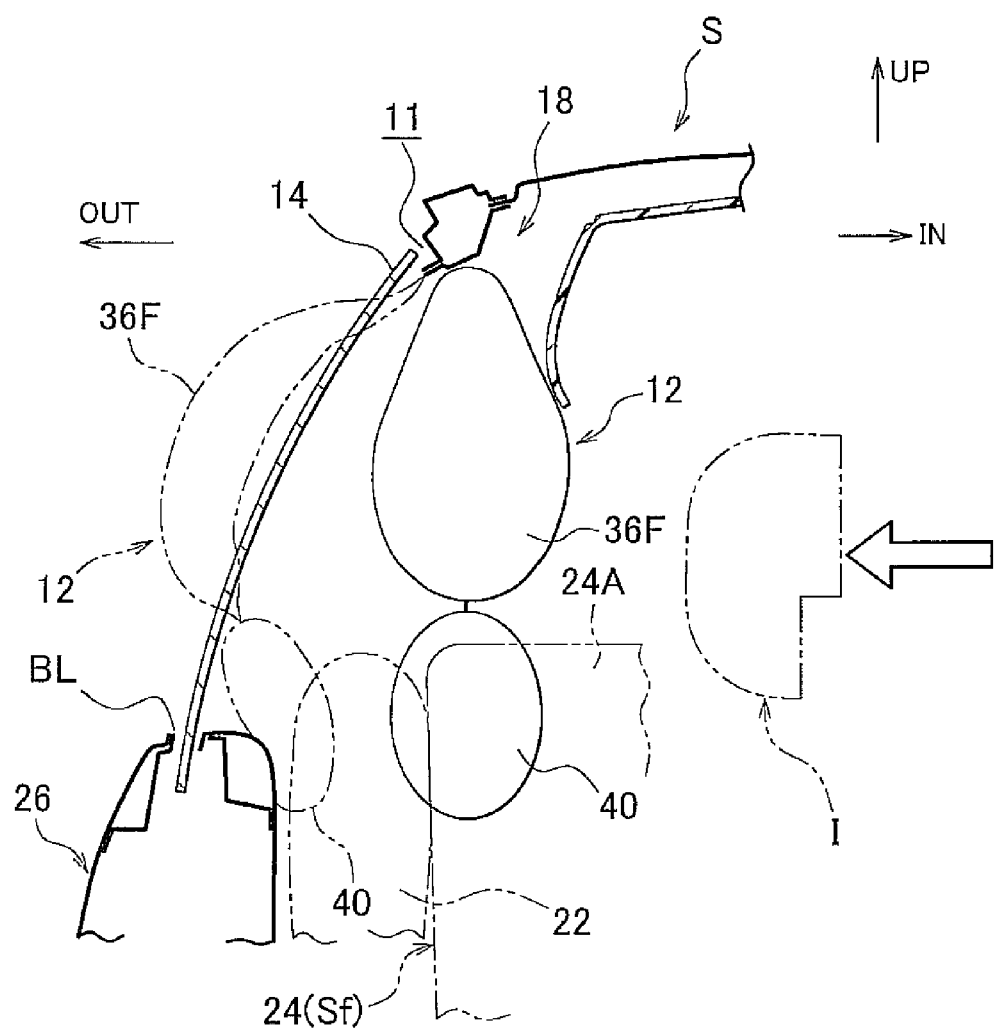
FIG. 3 is a front view showing a frame format of the vehicle air bag system according to the first example embodiment of the invention.

As shown in FIGS. 1 and 2, when the vehicle seat 24 of the front seat Sf is in the front-most position as well as when the vehicle seat 24 of the front seat Sf is in the rear-most position, i.e., regardless of the front-back position of the vehicle seat 24, the deployment area of the lower portion of the delay chamber 40 is set to overlap with the deployment area of the upper portion of the side air bag 22. Furthermore, as shown in FIG. 3, the front delay chamber 40 that protects the head is set to overlap with the deployment area of the upper portion of the side air bag 22 when viewed from the front as well. The curtain air bag 12 shown by the virtual line in FIG. 3 shows the process by which it protects the head of an occupant.

The deployment position of this delay chamber 40 is a position that enables the head of an occupant to be protected by the front main chamber 36F near the vehicle seat 24 when a rollover occurs. Region B shown by the thin solid line in FIG. 4 indicates a test point (striking point) struck by an impactor I (see FIG. 3) that corresponds to the head of an occupant in a rollover test in compliance with Federal Motor Vehicle Safety Standards (FMVSS).

Also, when a rollover occurs, the delay chamber 40 deploys to an area below the beltline BL and corresponds to portion below the beltline BL of the front side door 26, in order to protect the head of an occupant by inhibiting the head of the occupant from moving toward the outside of the vehicle.

Here, the flow resistance (i.e., the pressure loss) of the gas in the narrowed passage 38 is larger than the flow resistance of the gas inside the main chamber 36 (i.e., the main deployment portion of the curtain air bag), so the delay chamber 40 inflates and deploys at a later time than the main chamber 36 does.

Figure 6:
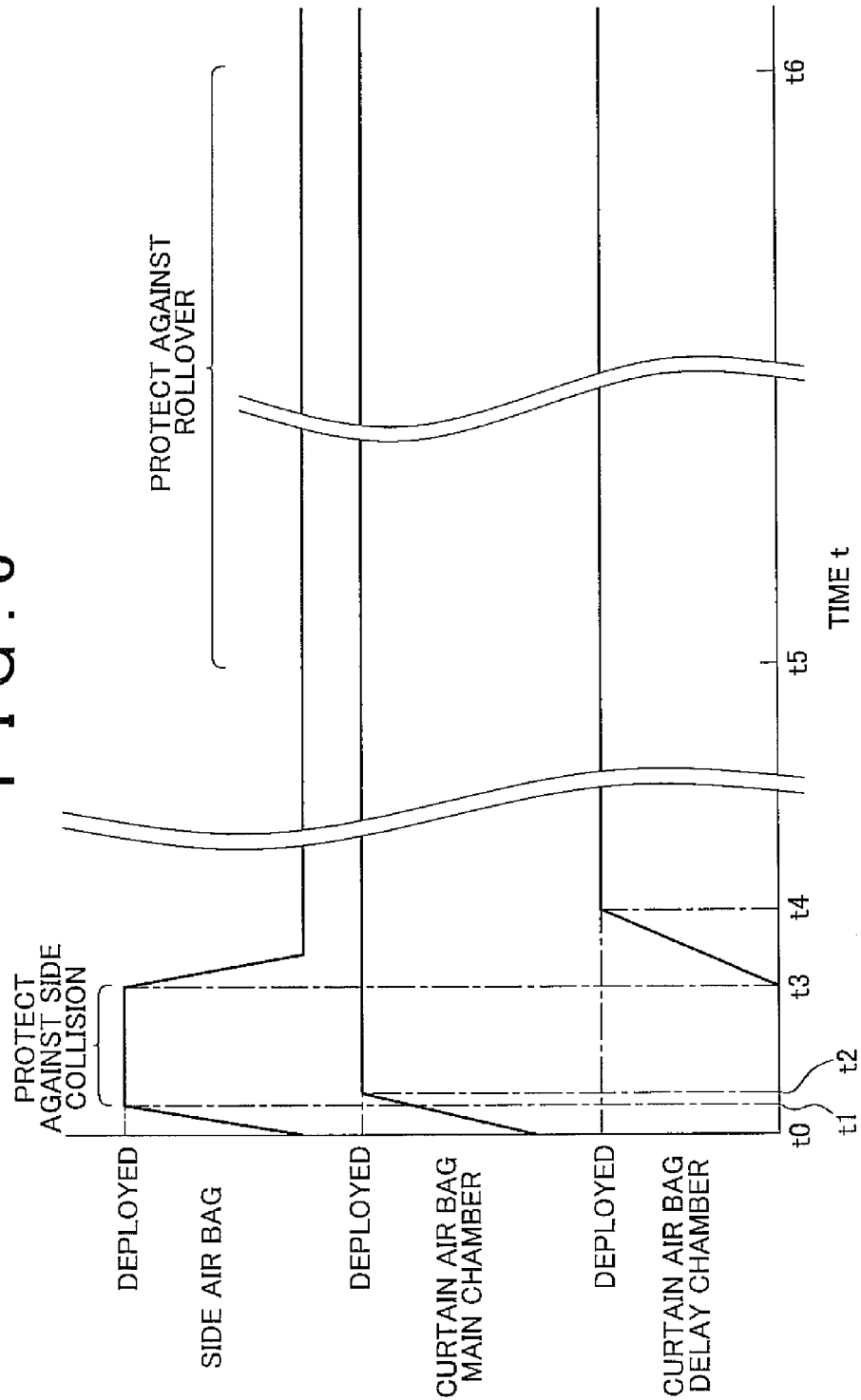
FIG. 6 is a line graph showing the deployment timing of the side air bag and the curtain air bag that are included in the vehicle air bag system according to the first example embodiment of the invention, and change in internal pressures of the side air bag and the curtain air bag.

As shown in FIG. 6, with the vehicle air bag system 10, the side air bag 22 finishes deploying at time t1 that is approximately 20 milliseconds after a side collision signal is input from the side collision sensor 30, i.e., after time t0 at which the inflator 20 and the inflator 28 are activated, and the main chamber 36 of the curtain air bag 12 finishes deploying at time t2 that is approximately 35 milliseconds after time t0. The internal pressure of the side air bag 22 is decreased sufficiently after time t3 by the gas contracting (decreasing in volume) due to heat exchange with the air inside the vehicle cabin, and/or by the gas being discharged through a vent hole, not shown.

On the other hand, when a side collision occurs, protection of the upper body of the occupant by the side air bag 22 and protection of the head of the occupant by the main chamber 36 of the curtain air bag 12 ends by time t3 that is approximately 100 milliseconds after time t0. The delay chamber 40 is set (in terms of design aim) to effectively start to inflate from this time t3. In this vehicle air bag system 10, the delay chamber 40 is configured (i.e., designed) to start to inflate after time t3 by making the inside diameter of the narrowed passage 38 within a range from 40 mm to 70 mm (55 mm in this example embodiment).

Therefore, with the vehicle air bag system 10, the delay chamber 40 inflates and deploys after the occupant is finished being protected by the curtain air bag 12 and the side air bag 22 when a side collision occurs. A rollover of the vehicle S due to a side collision occurs from between approximately 1.5 seconds (time t5) to approximately 6 seconds (time t6) after time t0, and a rollover of the vehicle S that is not due to a side collision occurs from between approximately 1.5 seconds (time t5) to approximately 6 seconds (time t6) after a R/O detection signal is output from the rollover sensor 32 (i.e., after time t0 that is the point at which the inflator 20 is activated).

In this example embodiment, the inflator 20 is a long flow type inflator that continues to supply gas for an extended period of time. As a result, for 6 seconds after time t0, the internal pressures of the main chamber 36 and the delay chamber 40 are able to be kept at an internal pressure of equal to or greater than a required pressure (such as 25 kPa). The inflator 20 is configured to keep the internal pressure of the main chamber 36 equal to or greater than 40 kPa, for example, for the period during which the occupant is being protected against a side collision, i.e., until time t3.

Further, the curtain air bag 12 includes a first auxiliary chamber 42 that serves as a front wrap portion for protecting the head of an occupant in the front seat Sf, forward of the front seat Sf when a rollover occurs, and a second auxiliary chamber 44 that serves as a rear wrap portion for protecting the head of an occupant in the rear seat Sr, forward of the rear seat Sr when a rollover occurs.

The first auxiliary chamber 42 deploys forward of the front main chamber 36F and forms a front end portion of the curtain air bag 12. The upper end side of the first auxiliary chamber 42 overlaps with the front pillar 16 when viewed from the side, and the lower end side of the first auxiliary chamber 42 is positioned below the beltline BL and overlaps with the front portion of the front side door 26. The front-most test point in the rollover test is covered by this first auxiliary chamber 42. The rear-most test point of the front seat Sf in the rollover test is covered by the front main chamber 36F and the extending chamber 36E.

The second auxiliary chamber 44 deploys forward of the rear main chamber 36R, and forms a portion between the rear main chamber 36R and the extending chamber 36E. The upper end side of the second auxiliary chamber 44 is attached (i.e., connected) to the lower edge portion of the gas supply passage 36C, and at least a portion of the lower end side of the second auxiliary chamber 44 is positioned below the beltline BL and overlaps with a rear side door 27. The front-most test point of the rear seat Sr in the rollover test is covered by the second auxiliary chamber 44 and the gas supply passage 36C. Meanwhile, the rear-most test point of the rear seat Sr in the rollover test is covered by the rear portion of the second auxiliary chamber 44 and the rear main chamber 36R.

The front end of the curtain air bag 12 described above, i.e., the first auxiliary chamber 42, is supported by the lower portion of the front pillar 16 via a support cloth (i.e., a tension cloth) 46 that is generally triangular in shape when viewed from the side. Also, the rear end of the curtain air bag 12, i.e., the rear main chamber 36R, is supported by the rear pillar 19 via a support cloth 48.

Next, the operation of the first example embodiment will be described with reference to FIG. 6 that is a timing chart showing the deployment (and deflation) timings of the side air bag 22, the main chamber 36, and the delay chamber 40.

With the vehicle air bag system 10 of the structure described above, when the vehicle S with the vehicle air bag system 10 sustains a side collision, the air bag ECU 34 that has received a side collision detection signal from the side collision sensor 30 activates the inflators 20 and 28 on the side where the side collision occurred (time t0). Accordingly, first, the side air bag 22 receives a supply of gas from the inflator 28 and consequently inflates, and finishes deploying (time t1), as shown in FIG. 6. Also, the side air bag 22 and the curtain air bag 12 (the portion except for mainly the delay chamber 40) receive a supply of gas from the inflator 20 and consequently inflate, and the main chamber 36, the first auxiliary chamber 42, and the second auxiliary chamber 44 of the curtain air bag 12 finish deploying (time t2).

As a result, the head of an occupant on the side of the side collision is protected by the main chamber 36 of the curtain air bag 12, and the upper body of that occupant is protected by the side air bag 22. Protection of the occupant from the side collision ends by time t3.

Here, with the vehicle air bag system 10, when protecting an occupant against a side collision, the delay chamber 40 of the curtain air bag 12 is prevented or restricted from inflating and deploying. Therefore, the delay chamber 40 will not interfere with the deployment of the side air bag 22 in the appropriate position, thus enabling the upper body of the occupant to be appropriately protected by the side air bag 22.

Also, after the occupant has finished being protected against a side collision, the delay chamber 40 that has received a supply of gas from the main chamber 36 via the narrowed passage 38 inflates and deploys. At this time, in the curtain air bag 12, the delay chamber 40 is deployed with the same internal pressure (less than the same in the deployment process) as the main chamber 36, while the internal pressures of the main chamber 36, the first auxiliary chamber 42, and the second auxiliary chamber 44 are maintained at 25 kPa or higher, for example.

Here, after protection of the occupant against the side collision ends (i.e., after time t3), the internal pressure of the side air bag 22 is sufficiently reduced (i.e., the side air bag 22 deflates), so the delay chamber 40 is able to appropriately deploy without being impeded by the side air bag 22 (while crushing the top of the side air bag 22). Therefore, if the vehicle S rolls over after a side collision, the head of the occupant is able to be well protected against the rollover by the curtain air bag 12 in which the delay chamber 40 deploys together with the main chamber 36, the first auxiliary chamber 42, and the second auxiliary chamber 44.

That is, as shown by the virtual line in FIG. 3, the curtain air bag 12 is such that the lower portion of the delay chamber 40 that deploys to below the beltline BL corresponds to the front side door 26. Therefore, if the head of the occupant strikes it, the delay chamber 40 is able to suppress the amount that the head moves toward the outside of the vehicle while supporting the reaction force with the abutting portion.

In particular, with the curtain air bag 12, the extending chamber 36E that is communicated with the delay chamber 40 corresponds to the center pillar 15, so the extending chamber 36E makes it possible to even further suppress the amount that the head moves toward the outside of the vehicle when a rollover occurs while supporting the reaction force.

As described above, in the vehicle air bag system 10, the delay chamber 40 is configured to deploy later than the side air bag 22, using the time difference between the timing at which protection against the side collision is required and the timing at which protection against the rollover is required. Accordingly, with a structure in which the delay chamber 40 deploys overlapping with the deployment area of the side air bag 22 below the beltline BL in order to ensure protection of the occupant when a rollover occurs, the side air bag 22 is able to appropriately deploy (i.e., deploy in the planned position) without interfering with the delay chamber 40 when a side collision occurs.

Moreover, when a rollover after a side collision occurs, the internal pressure of the side air bag 22 that has fulfilled its function is reduced, so the delay chamber 40 is able to deploy well without being impeded by the side air bag 22. In the case of a rollover without a side collision, the side air bag 22 will not deploy, so the delay chamber 40 is able to deploy well. Even if the side air bag 22 were configured to deploy in a rollover, the delay chamber 40 would still deploy well, just as it would in a rollover after a side collision. That is, even if only a rollover occurs, the head of the occupant is able to be well protected by the curtain air bag 12.

Also, with the vehicle air bag system 10, the delay chamber 40 deploys in a position that overlaps with the deployment area of the side air bag 22, regardless of the longitudinal (i.e., front-back) position of the vehicle seat 24. Therefore, the delay chamber 40 is able to suppress the amount of movement of the head of the occupant toward the outside of the vehicle, regardless of the longitudinal position of the vehicle seat 24.

Furthermore, with the vehicle air bag system 10, the deployment timing of the delay chamber 40 is delayed by setting the size of the inside diameter of the narrowed passage 38 appropriately. Accordingly, the delay chamber 40 is able to be inflated and deployed after an extended period of time (100 msec) after time t0 at which the inflator 20 is activated. For example, in a comparative example in which the deployment timing of the delay chamber 40 is delayed by sewing the gas inlet of the delay chamber 40 with a tear seam, the tear seam will break by the time the internal pressure of the main chamber 36 reaches its peak. That is, the delay chamber 40 will start to inflate by time t2 (35 msec) which is when the main chamber 36 finishes deploying, so it is difficult to set the deployment timing of the delay chamber 40 to a desired timing.

In contrast, with the vehicle air bag system 10, the timing at which the gas flows into the delay chamber 40 is delayed and the flowrate of the inflowing gas is suppressed by the narrowed passage 38 that generates gas flow resistance, so the delay chamber 40 can be deployed at the desired timing. Also, making the inside diameter of the narrowed passage 38 40 mm to 70 nm (55 mm in this example embodiment) enables the delay chamber 40 to (essentially) start deploying approximately 100 msec after time t0, just as described above. If the inside diameter of the narrowed passage 38 exceeds 70 mm, the delay chamber 40 may deploy before the side air bag 22 finishes fulfilling its function. On the other hand, if the inside diameter of the narrowed passage 38 is less than 40 mm, the stress applied to the narrowed passage 38 will increase, possibly giving rise to other issues, such as the need for reinforcement or the like.

Furthermore, with the vehicle air bag system 10, the first auxiliary chamber 42 is provided in front of the curtain air bag 12 (i.e., forward of the front main chamber 36F), so the head of the occupant is able to be well protected forward of the front seat Sf when a rollover occurs. In particular, the upper end side of the first auxiliary chamber 42 abuts against the front pillar 16 and the lower end side of the first auxiliary chamber 42 abuts against the front side door 26, so the amount of movement of the head of an occupant (i.e., an occupant seated in a front seat) is able to be suppressed while the reaction force is well supported.

Also, furthermore, with the vehicle air bag system 10 the second auxiliary chamber 44 is provided in a rear portion of the curtain air bag 12 (i.e., forward of the rear main chamber 36R), so the head of the occupant is able to be well protected forward of the rear seat Sr when a rollover occurs. In particular, the upper end side of the second auxiliary chamber 44 is connected to the gas supply passage 36C and the lower end side of the second auxiliary chamber 44 abuts against the rear side door 27, so the second auxiliary chamber 44 is able to suppress the amount of movement of the head of an occupant (an occupant seated in a back seat) toward the outside of the vehicle while supporting the reaction force well.

Also, with the vehicle air bag system 10, the inflator 20 is arranged in substantially the center portion (above the center pillar 15) of the gas supply passage 36C, so the front main chamber 36F and the rear main chamber 36R are able to finish being deployed in a short period of time when a side collision occurs. That is, gas is supplied at a predetermined balance to the front main chamber 36F and the rear main chamber 36R, thus enabling both to be deployed well with little time difference.

(Other Example Embodiments)

Next, other example embodiments of the invention will be described. In the description below, structure that is basically the same as structure in the first example embodiment or otherwise described above will be denoted by the same reference characters used for the structure in the earlier description, and descriptions and illustrations thereof may be omitted.

(Second Example Embodiment)

Figure 7:
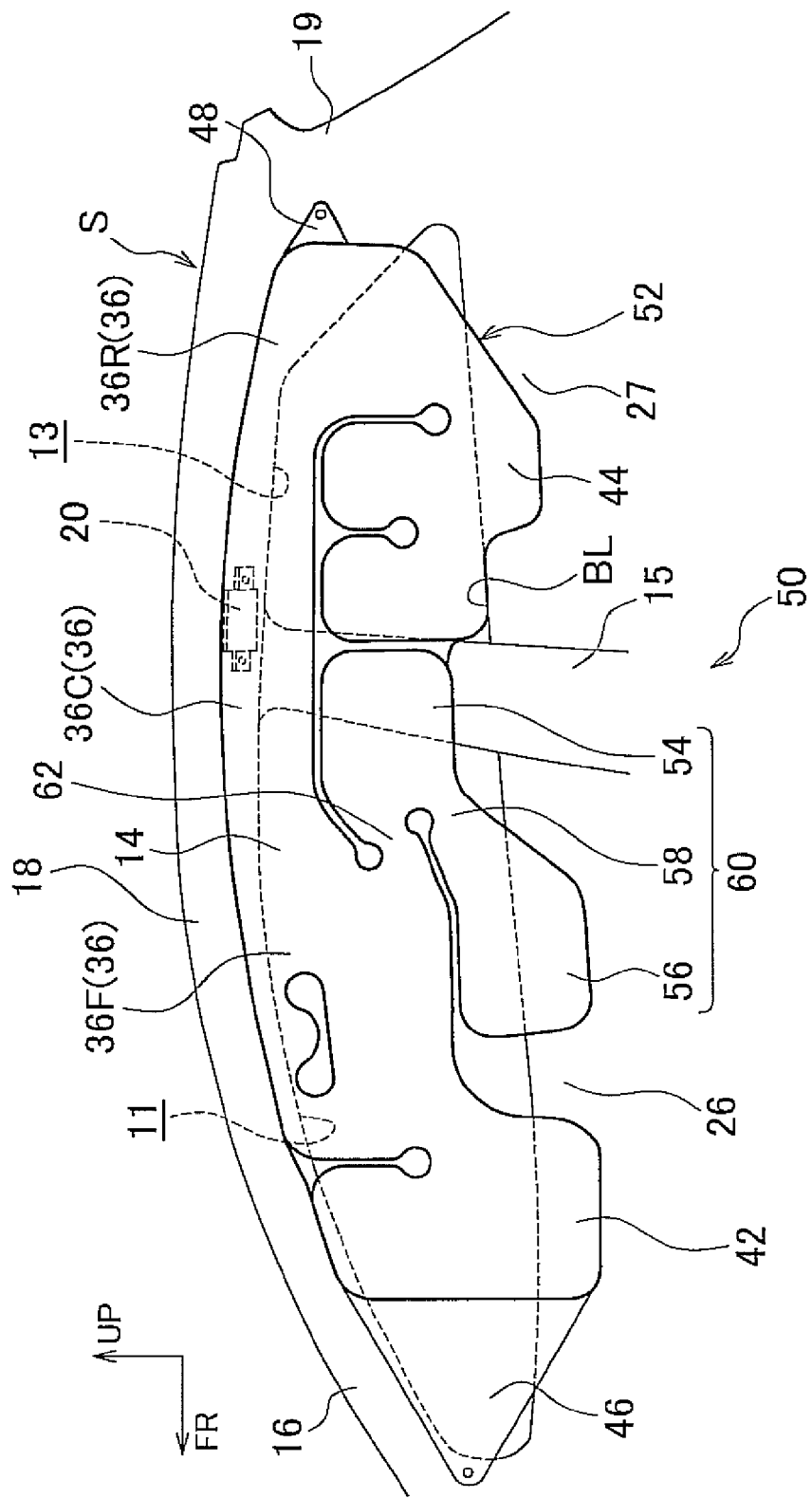
FIG. 7 is a side view, as viewed from the inside of the vehicle cabin, of the general overall structure of a vehicle air bag system according to a second example embodiment of the invention.

FIG. 7 is a side view corresponding to FIG. 1, of a curtain air bag 52 in a vehicle air bag system 50 according to a second example embodiment of the invention. As shown in the drawing, the curtain air bag 52 includes a delay chamber 60 instead of the extending chamber 36E, the narrowed passage 38, and the delay chamber 40. The delay chamber 60 includes a first delay chamber 54 that serves as a first delayed deployment portion, a second delay chamber 56 that serves as a second delayed deployment portion, and a narrowed passage 58 that serves as a restricting structure that communicates the first delay chamber 54 with the second delay chamber 56. These will now be described in detail.

The first delay chamber 54 has substantially the same structure as the extending chamber 36E except for that it receives a supply of gas from the front main chamber 36F via a narrowed passage 62. That is, the first delay chamber 54 is shaped like the extending chamber 36E and deploys in substantially the same position as the extending chamber 36E. The inside diameter of the narrowed passage 62 is 40 mm to 70 mm (55 mm in this example embodiment).

Also, the second delay chamber 56 and the narrowed passage 58 have the same dimensions and shapes as the delay chamber 40 and the narrowed passage 38, respectively. Although the side air bag 22 is not shown in FIG. 7, the deployment area of the lower portion of the second delay chamber 56 is set to overlap with the deployment area of the upper portion of the side air bag 22, regardless of the longitudinal position of the vehicle seat 24.

As a result, the delay chamber 60 forms a two-stage delayed deployment structure by the first delay chamber 54 and the second delay chamber 56 being communicated in series with the main chamber 36 via the narrowed passages 62 and 58. That is, the narrowed passage 62 is configured to suppress the inflow of gas into the first delay chamber 54 by the pressure balance with the main deployment portion of the curtain air bag 52, so a small amount of gas will flow into the first delay chamber 54 through the narrowed passage 62 in the course of deployment of the main chamber 36. Also, the first delay chamber 54 can be regarded as a first delayed deployment portion that temporarily stops gas flowing in through the narrowed passage 62 in this way.

On the other hand, the second delay chamber 56 may be regarded as a second delayed deployment portion that is inflated and deployed by gas being supplied through the narrowed passage 58 after the first delay chamber 54 is inflated and deployed (after the internal pressure has increased).

Figure 8:
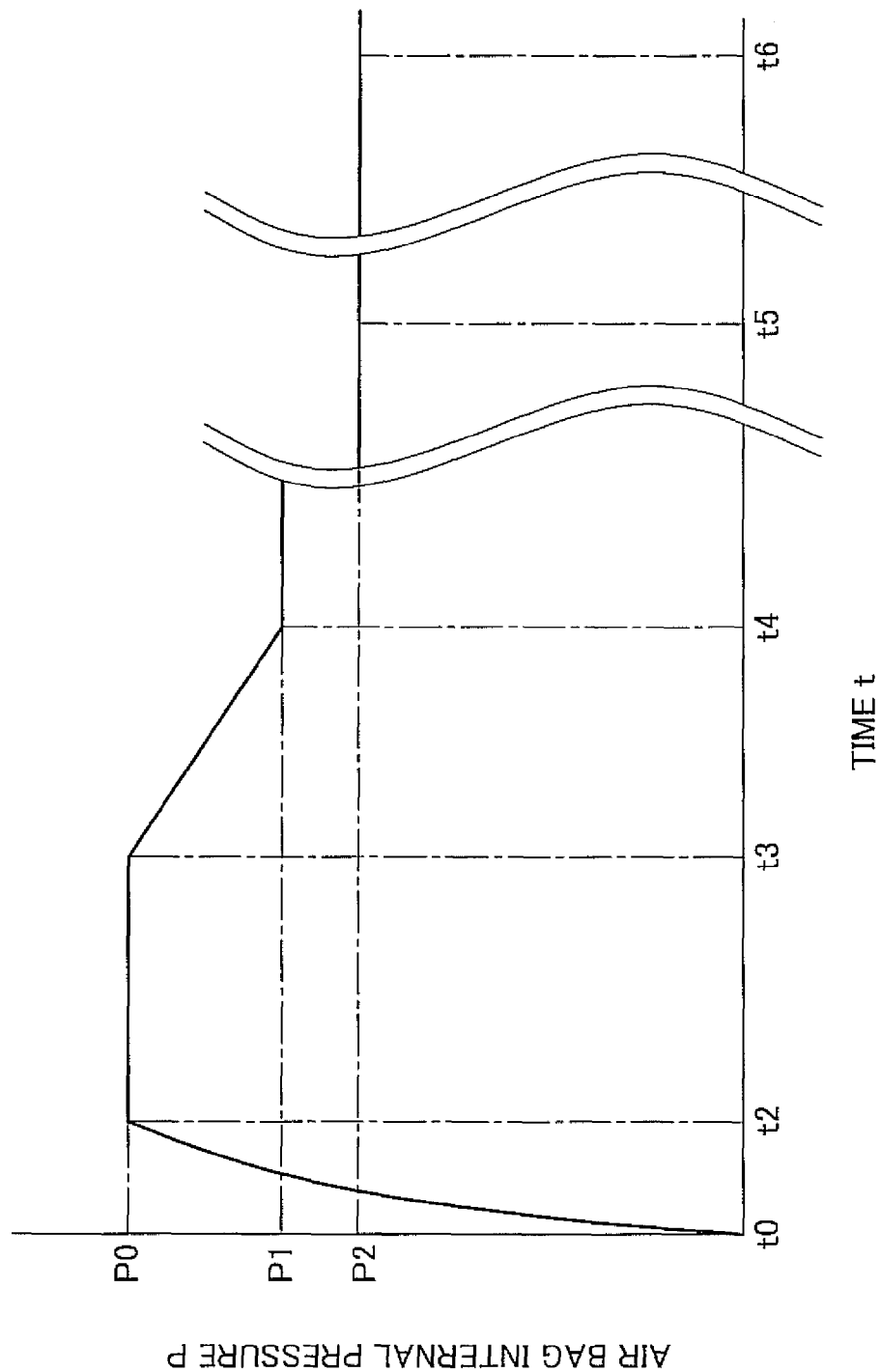
FIG. 8 is a line graph of the course of change in internal pressure of the curtain air bag that is included in the vehicle air bag system according to the second example embodiment of the invention.

Further, with the vehicle air bag system 50, the volume Vd of the delay chamber 60 is no less than ⅙ and no more than ⅓ of the total volume Vt of the curtain air bag 52 (i.e., ⅙≤Vd/Vt≤⅓; this may be referred to as "⅙ to ⅓" or the like in the description below). In other words, the ratio of the total volume Vt of the curtain air bag 52, the volume Vs of the main chamber 36, the first auxiliary chamber 42, and the second auxiliary chamber 44 that deploy when protecting the occupant against a side collision, and the volume Vd of the delay chamber 60 that additionally deploys when protecting an occupant against a rollover (i.e., Vt:Vs:Vd) is within the range of 6:5:1 to 5:4:1. This volume ratio will be described below with reference to FIG. 8. FIG. 8 is a view showing a frame format of the change over time in the internal pressure of the curtain air bag 52, but does not show the actual change in the internal pressure. Also, FIG. 8 does not show the change in the internal pressure of the side air bag 22, so time t1 is omitted in FIG. 8.

As described in the first example embodiment, in order to protect the head of an occupant when a side collision occurs (i.e., from time t0 to time t3), a bag internal pressure (P0) of no less than 40 kPa, for example, is necessary for the volume of the main chamber 36, the first auxiliary chamber 42, and the second auxiliary chamber 44. On the other hand, in order to protect the head of an occupant when a rollover occurs, a bag internal pressure (P2) of no less than 25 kPa, for example, is necessary for the total volume of the curtain air bag 52.

Here, as shown in FIG. 8, considering the fact that the internal pressure of the curtain air bag 52 decreases approximately 20% over time from time t3 to time t5, the internal pressure (P1) for the total volume of the curtain air bag 52 before this decrease (time t3) must be at least 31.25 kPa, i.e., 125% of 25 kPa. Also, considering the fact that the volume of the curtain air bag 52 at time t3 increases from the volume Vs by the amount of the volume Vd, $P1=P0\times Vs/(Vs+Vd)=P0\times Vs/Vt$.

Therefore, if $P1=31.25$ kPa and $P0=40$ kPa, then $Vs/Vt=P1/P0$ 0.8, and $Vt:Vd:Vs\approx 5:1:4$ ($Vd/Vt\approx 1/4$). Also, when the internal pressure P1 when a rollover occurs is set slightly larger than 25 kPa, Vd/Vt becomes smaller. For example, when $P1=27$ kPa, $Vt:Vd:Vs\approx 6:1:5$.

In this example embodiment, as described above, the volume ratio described above is set by making the delay chamber 60 have a two-stage delayed deployment structure, i.e., by replacing part (i.e., the front main chamber 36F) of the volume of the main chamber 36 with part (i.e., the first delay chamber 54) of the delay chamber 60. Therefore, the inflator 20 of the vehicle air bag system 50 is a normal inflator, not a long flow type inflator like that employed in the vehicle air bag system 10. The other structure of the vehicle air bag system 50, including portions not shown, is basically the same as the corresponding structure of the vehicle air bag system 10.

Therefore, with the vehicle air bag system 50 according to the second example embodiment as well, a similar effect can be obtained by basically the same operation as that of the vehicle air bag system 10 according to the first example embodiment. In the vehicle air bag system 50, the first delay chamber 54 supports the support reaction force when the first delay chamber 54, instead of the extending chamber 36E, protects the head of an occupant from a rollover.

Hereinafter, mainly portions of the operation of the second example embodiment that differ from the operation of the first example embodiment will be described. In the vehicle air bag system 50, the delay chamber 60 has a two-stage deployment structure, so the deployment timing of the second delay chamber 56 that has a deployment area that overlaps with the deployment area of the side air bag 22 can be more reliably delayed with respect to the deployment timing of the side air bag 22. That is, with the delay chamber 60, the supply of gas to the second delay chamber 56 that is the second stage delayed deployment portion is prevented or restricted until the first delay chamber 54 that is the first stage delayed deployment portion finishes inflating. Therefore, compared with the delay chamber 40 of the first example embodiment, the time at which the narrowed passage 58 starts to inflate can be reliably delayed by the time required to inflate the first delay chamber 54.

In particular, with the curtain air bag 52, the gas flow direction from the main chamber 36 to the first delay chamber 54 through the narrowed passage 62 is opposite the gas flow direction from the first delay chamber 54 to the second delay chamber 56 through the narrowed passage 58. Therefore, gas supplied from the main chamber 36 to the first delay chamber 54 doubles back inside the first delay chamber 54 and is supplied to the second delay chamber 56. That is, the time of the deployment delay of the second delay chamber 56 with respect to the main chamber 36 (i.e., the side air bag 22) is even easier to control than it is with a structure in which the gas passes straight through the first delay chamber 54.

Also, with the vehicle air bag system 50, the volume Vd of the delay chamber 60 is 1/6 to 1/5 of the total volume Vt of the curtain air bag 52, so the internal pressure of the curtain air bag 52 can be kept at a predetermined value (such as 25 kPa) or higher when a rollover occurs, without relying on the gas discharge characteristic of the inflator.

Conversely, in the curtain air bag 52, the volume that deploys when protecting an occupant from a side collision is limited mainly to the volume Vs of the main chamber 36, the first auxiliary chamber 42, and the second auxiliary chamber 44. Therefore, in the curtain air bag 52, the internal pressure of the portion that is deployed when protecting an occupant from a side collision is able to be brought to a predetermined value (such as 40 kPa) or higher with a small amount of gas or in a short period of time. As a result, with the vehicle air bag system 50, a low-volume inflator 20 is able to be used, compared with a comparative example in which the entire curtain air bag 52 is deployed (i.e., in which gas for the total volume Vt is required) when protecting an occupant from a side collision.

In the second example embodiment, the narrowed passage 58 is provided with the delay chamber 60 as a restricting structure, but the invention is not limited to this. For example, as the restricting structure, instead of the narrowed passage 58, a structure may be employed in which the first delay chamber 54 and the second delay chamber 56 are sewn together by a tear seam that will tear when the internal pressure of the first delay chamber 54 exceeds a predetermined value.

(Third Example Embodiment)

FIG. 9 is a side view that corresponds to FIG. 1, of a curtain air bag 72 in a vehicle air bag system 70 according to a third example embodiment of the invention. As shown in the drawing, the curtain air bag 72 differs from the vehicle air bag system 10 according to the first example embodiment in that a delay chamber 74 is set on the rear seat Sr side in addition to the delay chamber 40 on the front seat Sf side.

More specifically, instead of the second auxiliary chamber 44, the curtain air bag 72 has a second auxiliary chamber 76 that is smaller than the second auxiliary chamber 44. This second auxiliary chamber 76 is communicated with the front side of the rear main chamber 36R, and is communicated with the delay chamber 74 via a narrowed passage 78 on the front side of the second auxiliary chamber 76. The second auxiliary chamber 76 and the delay chamber 74 both have generally the same shape (i.e., have generally the same protection range for the head when a rollover occurs) as the second auxiliary chamber 44 when viewed from the side.

Also, in this example embodiment, the curtain air bag 72 has a first auxiliary chamber 80 instead of the first auxiliary chamber 42. The first auxiliary chamber 80 has a different shape than the first auxiliary chamber 42, but fulfills the same function as the first auxiliary chamber 42. It should be noted that in this example embodiment, the first auxiliary chamber 42 may be provided instead of the first auxiliary chamber 80, and in the first or second example embodiments, the first auxiliary chamber 80 may be provided instead of the first auxiliary chamber 42.

Also, with the vehicle air bag system 70, the sum of the volume of the delay chamber 40 on the front seat Sf side and the volume of the delay chamber 74 on the rear seat Sr side corresponds to the volume Vd. That is, in the third example embodiment as well, the volume Vd of the delay chambers 40 and 74 is ⅙ to ⅓ of the total volume Vt of the curtain air bag 72 (i.e., ⅙≤Vd/Vt≤⅓). The other structure of the vehicle air bag system 70, including portions not shown, is basically the same as the corresponding structure of the vehicle air bag system 10.

Therefore, with the vehicle air bag system 70 according to the third example embodiment as well, a similar effect can be obtained by basically the same operation as that of the vehicle air bag system 10 according to the first example embodiment. Also, in the vehicle air bag system 70, the sum of the volumes Vd of the delay chambers 40 and 70 is ⅙ to ⅓ of the total volume Vt of the curtain air bag 72, so the internal pressure of the curtain air bag 52 can be kept at a predetermined value (such as 25 kPa) or higher when a rollover occurs, without relying on the gas discharge characteristic of the inflator, just as in the vehicle air bag system 50 according to the second example embodiment.

Also, just as in the second example embodiment, in the curtain air bag 72, the volume that deploys when protecting an occupant from a side collision is limited mainly to the volume Vs of the main chamber 36, the first auxiliary chamber 42, and the second auxiliary chamber 44. Therefore, in the curtain air bag 72, the internal pressure of the portion that is deployed when protecting an occupant from a side collision is able to be brought to a predetermined value (such as 40 kPa) or higher with a small amount of gas or in a short period of time. As a result, with the vehicle air bag system 70, a low-volume inflator 20 is able to be used, compared with a comparative example in which the entire curtain air bag 72 is deployed (i.e., in which gas for the total volume Vt is required) when protecting an occupant from a side collision.

In the third example embodiment, the sum of the volumes Vd of the delay chambers 40 and 72 are set to ⅙ to ⅓ of the total volume Vt of the curtain air bag 72 by arranging the delay chamber 74 on the rear seat Sr side, but the invention is not limited to this. For example, the volume Vd of the delayed deployment portion may be set to ⅙ to ⅓ of the total volume Vt of the curtain air bag 72 by having some or all of the first auxiliary chambers 42 and 80 be a delayed deployment portion. Also, the volume Vd of the delayed deployment portion may be set to ⅙ to ⅓ of the total volume Vt of the curtain air bag 72 by having the entire second auxiliary chamber 44 (i.e., the second auxiliary chamber 76 and the delay chamber 74) be a delayed deployment portion.

Also, the invention is not limited to the shape of the curtain air bag 12 in the example embodiments described above. For example, the front main chamber 36F and the rear main chamber 36R of the main chamber 36 are not limited to being communicated by the gas supply passage 36C. Instead, a portion corresponding to the extending chamber 36E may be communicated with a portion corresponding to the second auxiliary chamber 44.

Moreover, in the second example embodiment, the volume Vd of the delay chamber 60 that forms the two-stage delayed deployment structure is ⅙ to ⅓ of the total volume Vt, but the invention is not limited to this. For example, the volume of the first delay chamber 54 may be set for only the two-stage delayed deployment structure. Accordingly, when the volume of the first delay chamber 54 is smaller, it is possible to have the volume Vd of the delayed deployment portion be ⅙ to ⅓ of the total volume Vt by providing another delayed deployment portion.

Furthermore, in the example embodiments described above, the invention is applied to the vehicle S provided with the rear seat Sr and the rear side door 27, but the invention is not limited to this. For example, the invention may also be applied to a two-door vehicle that has no rear side door 27, a two-seat vehicle that has no rear seat Sr, or a vehicle that has three or more rows of seats, or the like.

Also, in the example embodiments described above, the side air bag 22 is arranged in the seat back side portion of the front seat Sf, but the invention is not limited to this. For example, the side air bag may also be provided on the vehicle body side (i.e., the front side door 26 or the center pillar 15) next to the seat back 24A, or provided in a side portion of the seat back of the rear seat Sr.

What is claimed is:

1. An air bag system comprising:
    a side air bag that is housed folded up in a vehicle seat or a vehicle body side portion, and the side air bag inflates by receiving a supply of gas when a side collision of a vehicle occurs, and the side air bag deploys between an occupant seated in the vehicle seat and the vehicle body side portion;
    a curtain air bag housed folded up in an upper edge portion of an opening for getting into and out of the vehicle, in the vehicle body, and the curtain air bag inflates by receiving a supply of gas when a side collision of the vehicle and a rollover of the vehicle occur, and the curtain air bag deploys in a curtain shape downward with respect to the vehicle; and
    a delayed deployment portion provided in the curtain air bag, and the delayed deployment portion inflates later than a main deployment portion of the curtain air bag and the delayed deployment portion inflates after a completion of inflation of the side air bag, the delayed deployment portion inflates by receiving a supply of gas through a narrowed passage from the main deployment portion of the curtain air bag,
    the delayed deployment portion includes a first delayed deployment portion and a second delayed deployment portion, the first delayed deployment portion receives a supply of gas through a narrowed passage from the main deployment portion of the curtain air bag, the second delayed deployment portion receives a supply of gas from the first delayed deployment portion, and the first delayed deployment portion deploys with an upper end side connected to the curtain air bag and the second delayed deployment portion deploys with a lower end side below a beltline and in an area that overlaps with a deployment area of the side air bag,
    the delayed deployment portion includes a restricting structure that restricts the supply of gas to the second delayed deployment portion from the first delayed deployment portion until an internal pressure of the first delayed deployment portion exceeds a predetermined value.

2. The air bag system according to claim 1, wherein the first delayed deployment portion deploys overlapping with a center pillar when viewed from a side, and the first delayed deployment portion is communicated with a rear portion of the second delayed deployment portion when at least the internal pressure exceeds the predetermined pressure; and the second delayed deployment portion is configured to deploy with the lower end side below the beltline and in an area that overlaps with the deployment area of the side air bag for a front seat when viewed from the side.

3. The air bag system according to claim 2, wherein a direction in which gas is supplied from the first delayed deployment portion to the second delayed deployment portion is opposite a direction in which gas is supplied from the main deployment portion of the curtain air bag to the first delayed deployment portion.

4. The air bag system according to claim 1, wherein the side air bag is housed in the vehicle seat, the position of which is able to be adjusted in a front-back direction; and the second delayed deployment portion deploys with the lower end side overlapping with the side air bag in an area from a deployment position of the side air bag when the vehicle seat is in a front-most position to a deployment position of the side air bag when the vehicle seat is in a rear-most position.

5. The air bag system according to claim 1, wherein the narrowed passage has an inside diameter in a gas flow state of no less than 40 mm and no more than 70 mm.

6. The air bag system according to claim 1, wherein a volume of the delayed deployment portion is no less than 1/6 and no more than 1/5 of a total volume of the curtain air bag.

7. The air bag system according to claim 1, wherein the curtain air bag has a front wrap portion that inflates and deploys forward of a front seat so as to overlap with a portion below the beltline of the vehicle body and a front pillar when viewed from the side.

8. The air bag system according to claim 1, wherein the curtain air bag has a rear wrap portion that deploys with an upper end side connected to the main deployment portion of the curtain air bag, and a lower end side overlapping with a portion below the beltline of the vehicle body when viewed from the side.

9. The air bag system according to claim 8, wherein the main deployment portion has a front main deployment portion that deploys at a side of a front seat and a rear main deployment portion that deploys at a side of a rear seat, and the rear wrap portion is connected to the rear main deployment portion.

10. The air bag system according to claim 1, further comprising:
an inflator that supplies gas to the curtain air bag.

11. The air bag system according to claim 10, wherein the main deployment portion of the curtain air bag has a front main deployment portion that deploys at a side of a front seat and a rear main deployment portion that deploys at a side of a rear seat, and the inflator is arranged between the front main deployment portion and the rear main deployment portion in an upper edge portion of the opening for getting into and out of the vehicle.

12. The air bag system according to claim 1, further comprising:
a collision sensor that predicts or detects a side collision of the vehicle.

13. The air bag system according to claim 1, further comprising:
a rollover sensor that predicts or detects a rollover of the vehicle.

14. The air bag system according to claim 1, wherein: the side air bag does not overlap the main deployment portion of the curtain air bag.

15. The air bag system according to claim 1, wherein the first delayed deployment portion deploys overlapping with the center pillar when viewed from a side, and the first delayed deployment portion is communicated with a rear portion of the second delayed deployment portion when at least the internal pressure exceeds the predetermined pressure; and a direction in which gas is supplied from the first delayed deployment portion to the second delayed deployment portion is opposite a direction in which gas is supplied from the main deployment portion of the curtain air bag to the first delayed deployment portion.

16. An air bag system comprising:
a side air bag housed folded up in a vehicle seat or a vehicle body side portion, and the side air bag inflates by receiving a supply of gas when a side collision of a vehicle occurs, and the side air bag deploys between an occupant seated in the vehicle seat and the vehicle body side portion;
a curtain air bag housed folded up between a roof side rail and a roof headlining, in the vehicle body, and the curtain air bag inflates by receiving a supply of gas when a side collision of the vehicle and a rollover of the vehicle occur, and the curtain air bag deploys in a curtain shape downward with respect to the vehicle; and
a delayed deployment portion provided in the curtain air bag, and the delayed deployment portion inflates later than a main deployment portion of the curtain air bag and the delayed deployment portion inflates after a completion of inflation of the side air bag, the delayed deployment portion inflates by receiving a supply of gas through a narrowed passage from the main deployment portion of the curtain air bag,
the delayed deployment portion includes a first delayed deployment portion and a second delayed deployment portion, the first delayed deployment portion receives a supply of gas through a narrowed passage from the main deployment portion of the curtain air bag, the second delayed deployment portion receives a supply of gas from the first delayed deployment portion, and the first delayed deployment portion deploys with an upper end side connected to the curtain air bag and the second delayed deployment portion deploys with a lower end side below a beltline and in an area that overlaps with a deployment area of the side air bag,
the delayed deployment portion includes a restricting structure that restricts the supply of gas to the second delayed deployment portion from the first delayed deployment portion until an internal pressure of the first delayed deployment portion exceeds a predetermined value.

* * * * *